(12) United States Patent
Mermoud et al.

(10) Patent No.: US 12,395,421 B1
(45) Date of Patent: Aug. 19, 2025

(54) MEASURING PERFORMANCE IN COGNITIVE NETWORKS

(71) Applicant: Cisco Technology, Inc., San Jose, CA (US)

(72) Inventors: Grégory Mermoud, Venthône (CH); Jean-Philippe Vasseur, Combloux (FR)

(73) Assignee: Cisco Technology, Inc., San Jose, CA (US)

( * ) Notice: Subject to any disclaimer, the term of this patent is extended or adjusted under 35 U.S.C. 154(b) by 21 days.

(21) Appl. No.: 18/443,952

(22) Filed: Feb. 16, 2024

(51) Int. Cl.
*H04L 43/55* (2022.01)
*H04L 41/147* (2022.01)
*H04L 43/08* (2022.01)

(52) U.S. Cl.
CPC ............ *H04L 43/55* (2022.05); *H04L 41/147* (2013.01); *H04L 43/08* (2013.01)

(58) Field of Classification Search
None
See application file for complete search history.

(56) References Cited

U.S. PATENT DOCUMENTS

| | | | |
|---|---|---|---|
| 10,719,301 B1 | 7/2020 | Dasgupta et al. | |
| 11,269,974 B1* | 3/2022 | Chaudhuri | G06Q 30/0241 |
| 2015/0294216 A1 | 10/2015 | Baughman et al. | |
| 2017/0244777 A1 | 8/2017 | Ouyang et al. | |
| 2018/0047071 A1* | 2/2018 | Hsu | G06Q 30/0282 |
| 2020/0302296 A1* | 9/2020 | Miller | G06N 20/20 |
| 2021/0103840 A1* | 4/2021 | Kwong | G06N 20/00 |
| 2021/0200616 A1* | 7/2021 | Xu | G06F 11/0751 |
| 2021/0304151 A1* | 9/2021 | Wadhwa | G06Q 10/1053 |
| 2022/0376998 A1* | 11/2022 | Vasseur | H04L 43/08 |
| 2023/0336464 A1 | 10/2023 | Mermoud et al. | |
| 2023/0376981 A1* | 11/2023 | Hall | G06N 5/022 |
| 2024/0015104 A1 | 1/2024 | Schornig et al. | |
| 2024/0291718 A1* | 8/2024 | Vuda | H04L 41/16 |
| 2024/0330993 A1* | 10/2024 | Al-Qurishi | G06F 40/20 |
| 2024/0356816 A1* | 10/2024 | Stark | H04W 36/305 |

(Continued)

FOREIGN PATENT DOCUMENTS

WO WO-2021051031 A1 * 3/2021 .......... G06F 11/3003

OTHER PUBLICATIONS

Agarwal S., "A Study of the Bipartite Ranking Problem in Machine Learning", University of Illinois, May 2005, 114 Pages.

(Continued)

*Primary Examiner* — Phyllis A Book
(74) *Attorney, Agent, or Firm* — Merchant & Gould P.C.; Kenneth J. Heywood; James E. Denker

(57) ABSTRACT

In one embodiment, a device uses a quality of experience model to make predictions comprising probabilities of a quality of experience metric for an online application accessed via a network being acceptable. The device determines, for each of a subset of the predictions having lowest probabilities of acceptable user experience from amongst the predictions, whether that prediction corresponds to a negative experience rating by a user of the online application. The device computes a negative retrieval accuracy for the quality of experience model based on a count of negative experience ratings associated with the subset and a size of the subset. The device uses the negative retrieval accuracy to detect an issue in the network.

20 Claims, 9 Drawing Sheets

(56) References Cited

U.S. PATENT DOCUMENTS

2024/0381337 A1* 11/2024 Wang ................ H04W 72/542
2024/0414050 A1* 12/2024 Sorrentino .......... H04L 41/5025
2025/0071034 A1*  2/2025 Wang ..................... H04L 41/16

OTHER PUBLICATIONS

Menon A.K., et al., "Bipartite Ranking: a Risk-Theoretic Perspective", Journal of Machine Learning Research, vol. 17, Nov. 2016, pp. 1-102.
Wikipedia: "Bayes Error Rate", Retrieved on Feb. 6, 2024, 3 Pages.
Wikipedia: "Bootstrapping", Retrieved on Feb. 6, 2024, 19 Pages.

* cited by examiner

MEASURING PERFORMANCE IN COGNITIVE NETWORKS

TECHNICAL FIELD

The present disclosure relates generally to computer networks, and, more particularly, to measuring performance in cognitive networks.

BACKGROUND

With the recent evolution of machine learning, predictive failure detection and proactive routing in a network now becomes possible through the use of machine learning techniques. For instance, modeling the delay, jitter, packet loss, etc. for a network path can be used to predict when that path will violate the service level agreement (SLA) of the application and reroute the traffic, in advance. However, doing so is also not without cost, as needlessly rerouting application traffic can also negatively impact the application experience of a user.

Traditionally, SLA thresholds have been used as a proxy for the true quality of experience (QoE) of an online application from the perspective of the end user. In other words, it is assumed that if the SLA is being violated, the QoE of the application is also degraded. While this may hold true in clear situation of network impairment, some of the more complex types of impairments could go unnoticed by network systems. Alternatively, a QoE prediction model could be trained using actual user feedback from users of the application. However, user feedback is also intrinsically subjective and noisy. Consequently, it is challenging to assess the performance and efficacy of a QoE prediction model that is trained using real user feedback.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
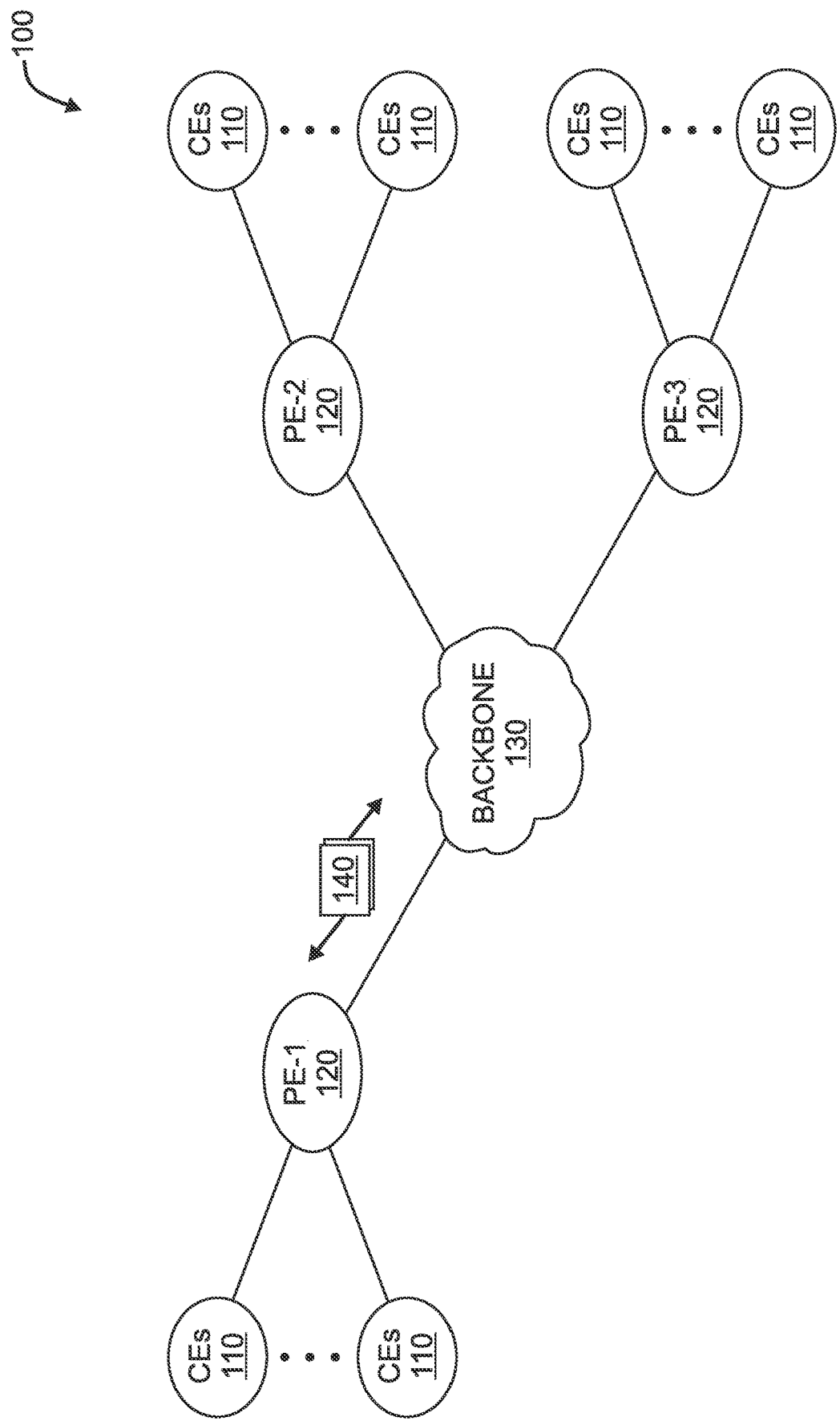
FIGS. 1A-1B illustrate an example communication network.

According to one or more embodiments of the disclosure, a device uses a quality of experience model to make predictions comprising probabilities of a quality of experience metric for an online application accessed via a network being acceptable. The device determines, for each of a subset of the predictions having lowest probabilities of acceptable user experience from amongst the predictions, whether that prediction corresponds to a negative experience rating by a user of the online application. The device computes a negative retrieval accuracy for the quality of experience model based on a count of negative experience ratings associated with the subset and a size of the subset. The device uses the negative retrieval accuracy to detect an issue in the network.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
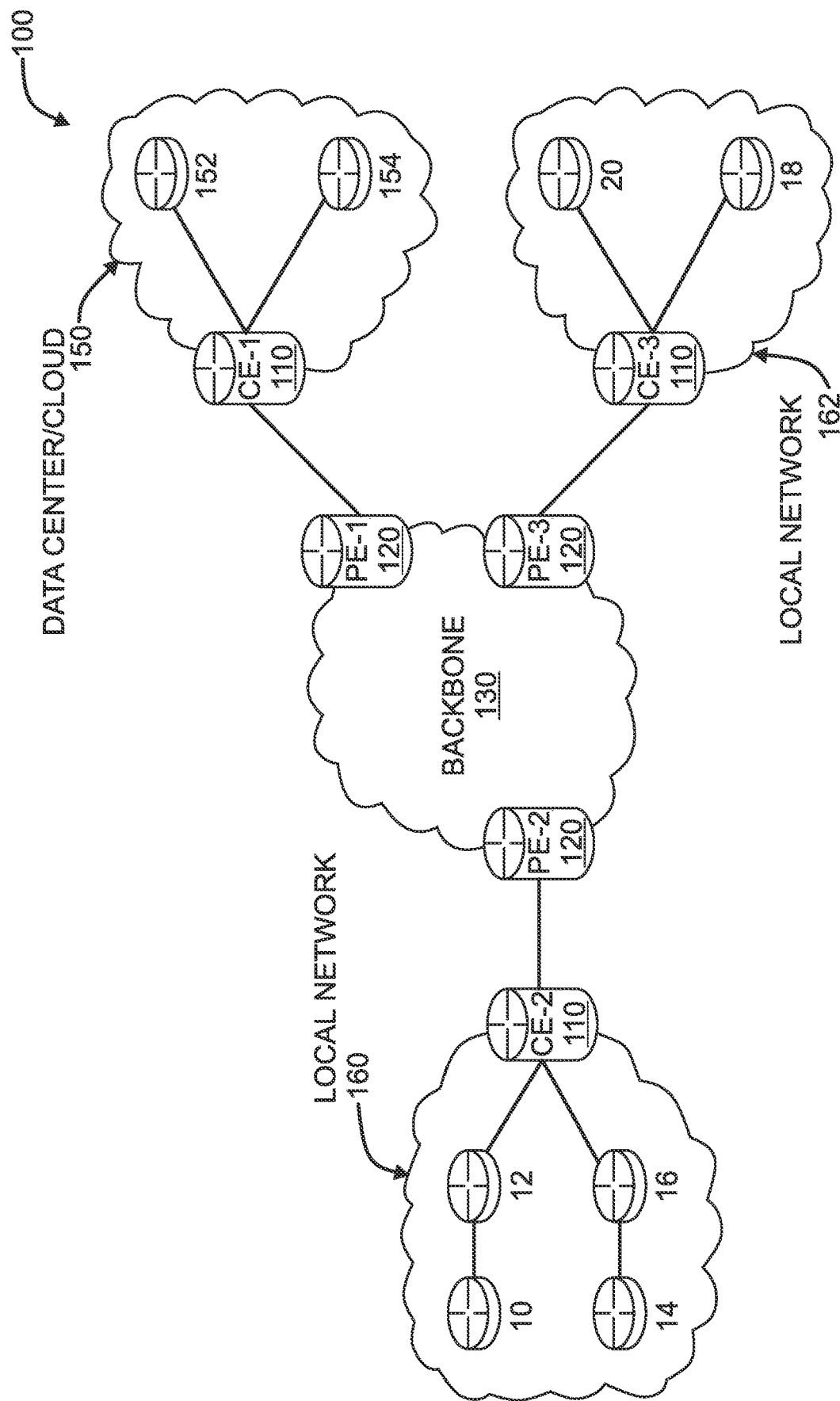

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
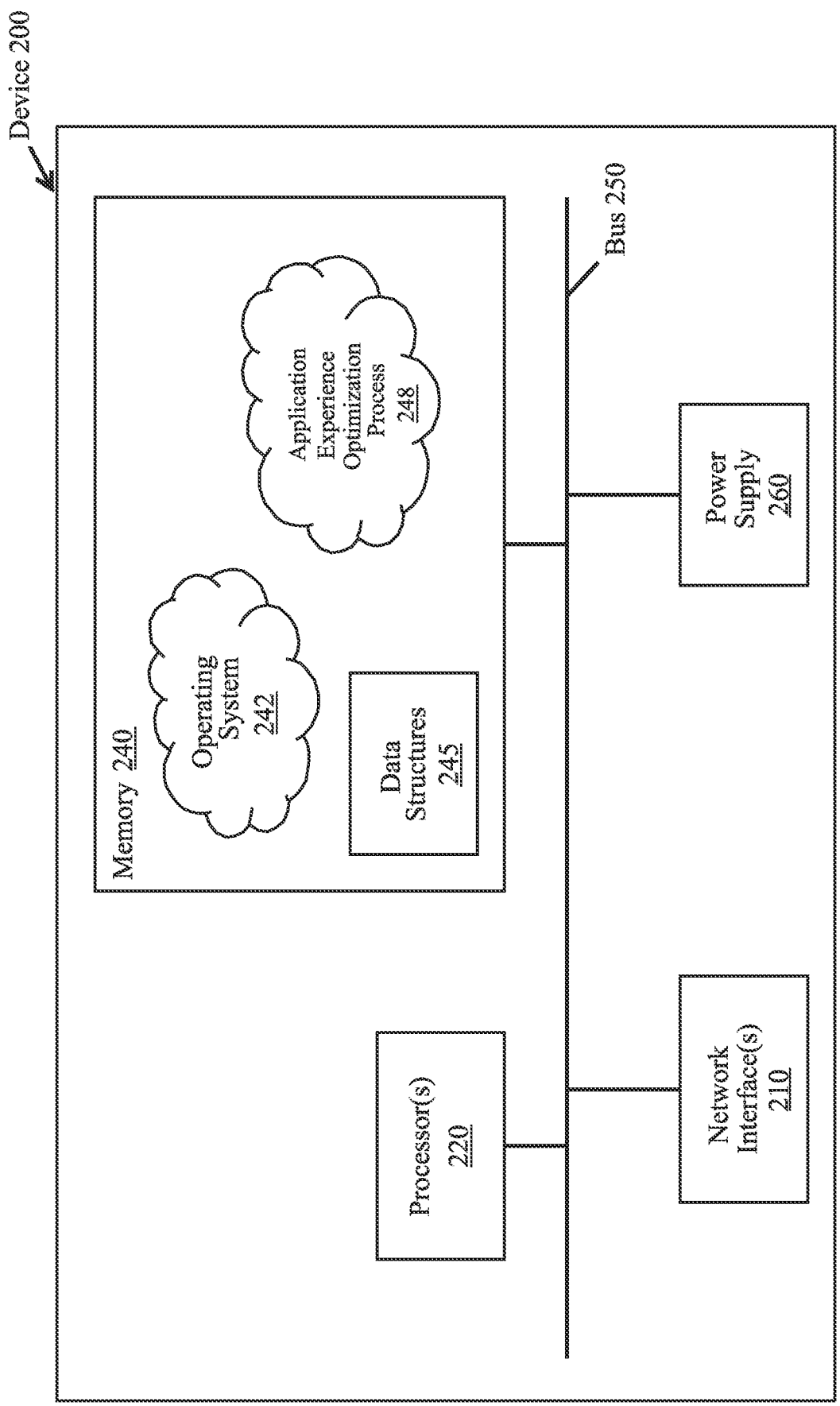
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, application experience optimization process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, application experience optimization process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
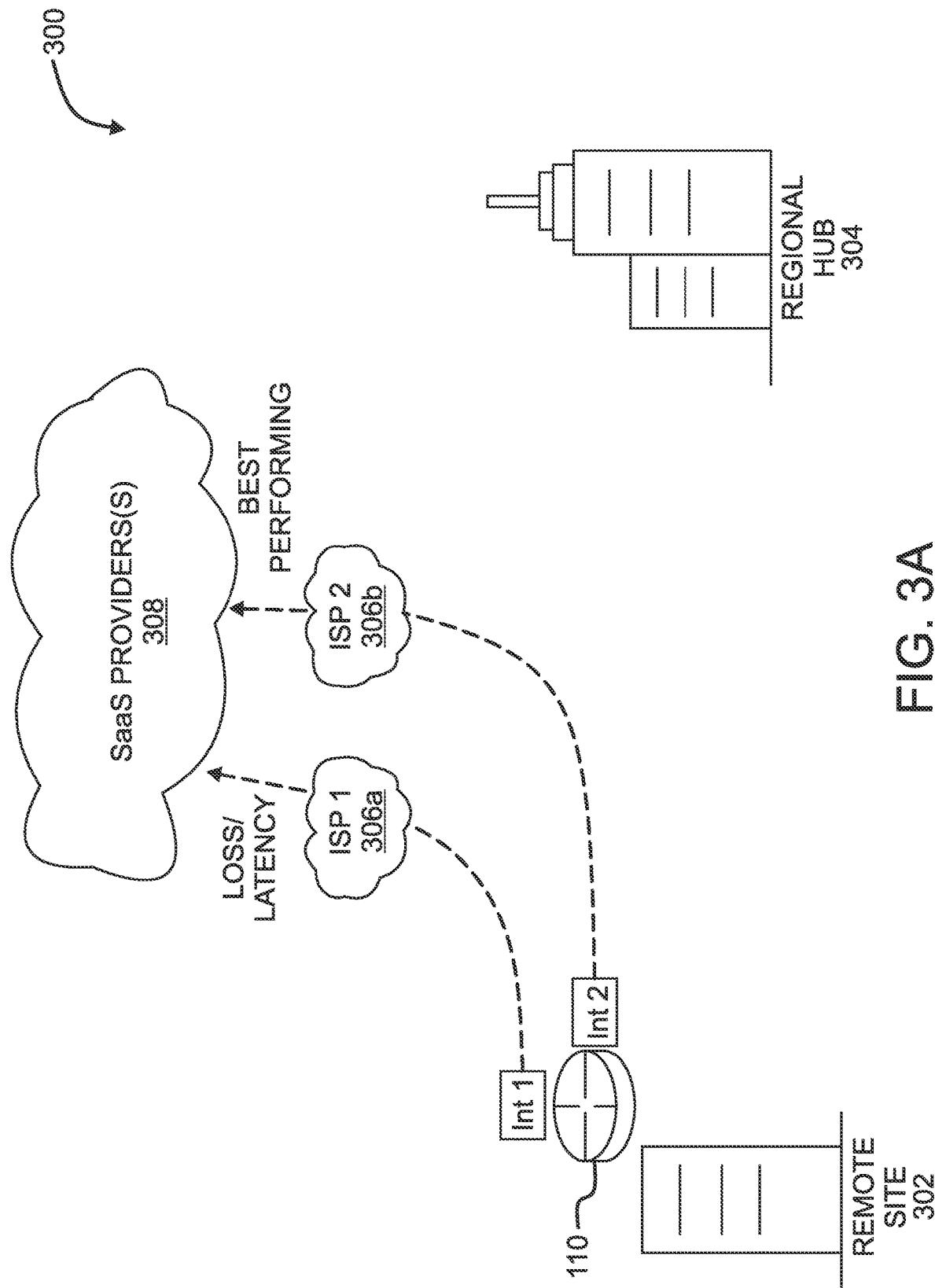
FIGS. 3A-3B illustrate example network deployments.
Figure 3B:
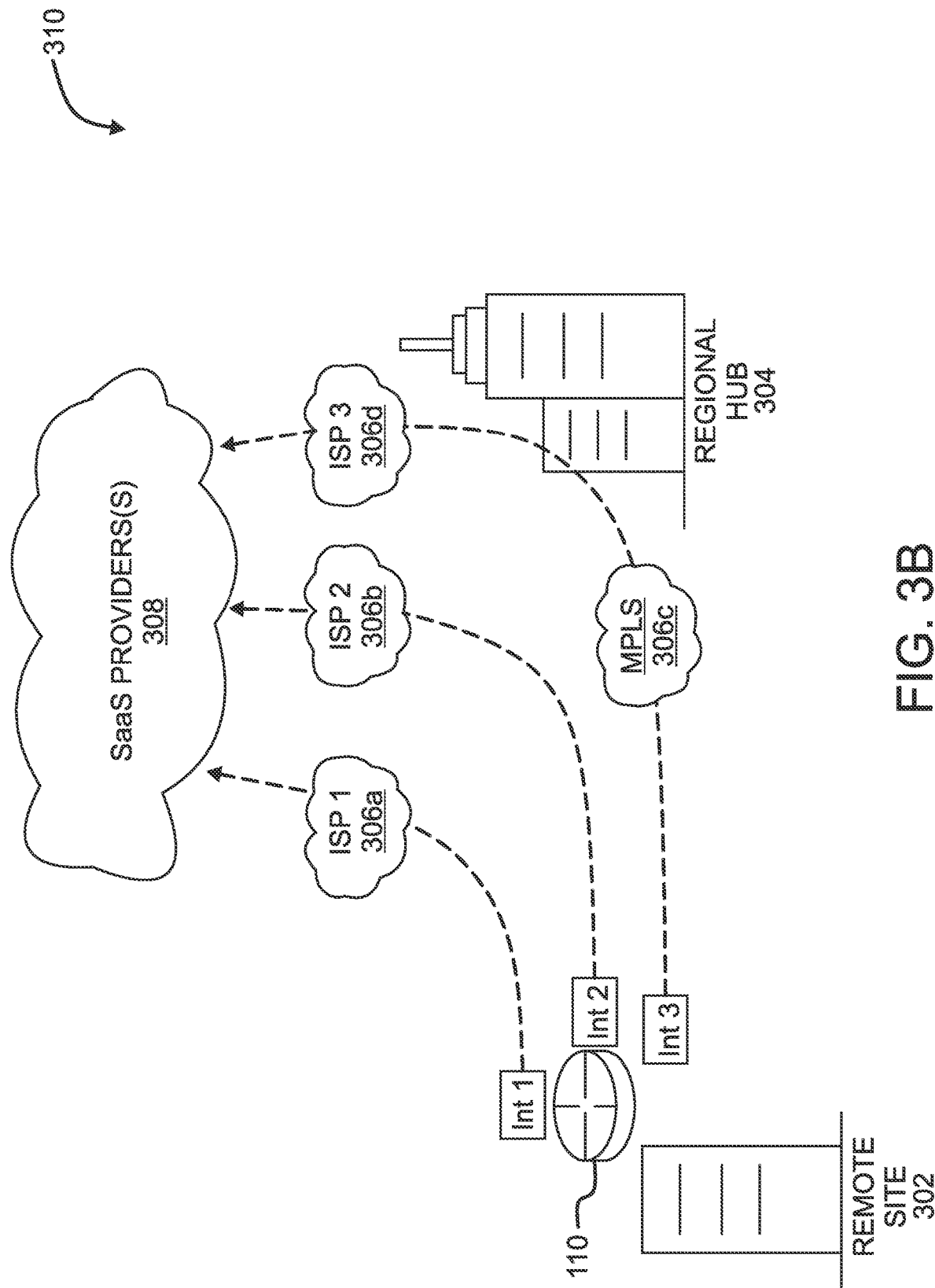

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
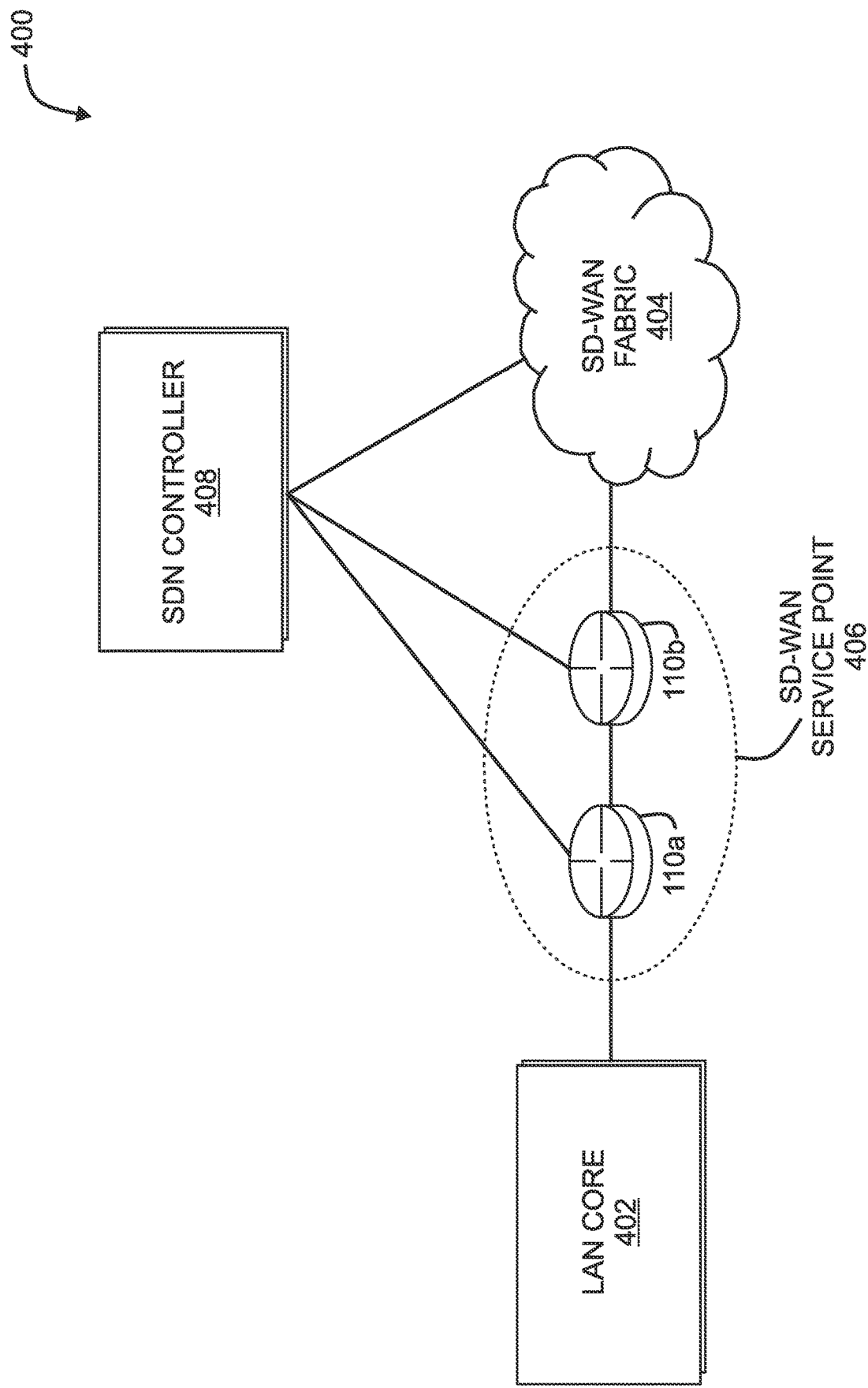
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model, Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to route traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.
Routing is still entirely reactive: decisions are made using probes that reflect the status of a path at a given time, in contrast with the notion of an informed decision.
SLA failures are very common in the Internet and a good proportion of them could be avoided (e.g., using an alternate path), if predicted in advance.

Figure 4B:
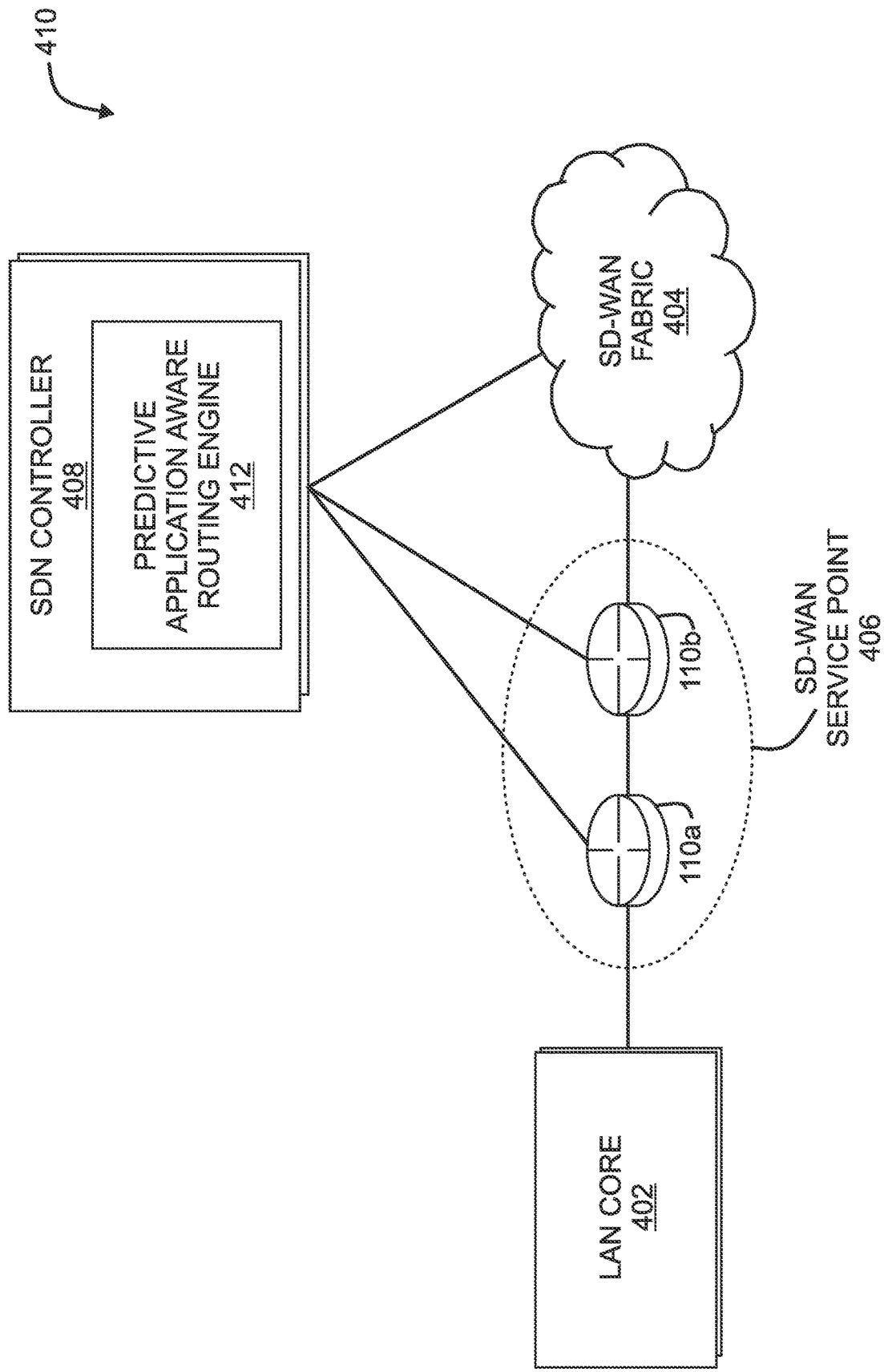

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN, Hybrid Work, and Zero Trust Network Access (ZTNA) have enabled unprecedented flexibility in terms of network architecture and underlay connectivity options. At the same time, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation Such an approach allowed layer dependency (e.g., often referred to as layer violation) to be avoided, at a time where a number of protocols and technologies were developed at each layer. More specifically, the Open Systems Interconnection (OSI) model divides networks into seven networking layers:

1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g., PHY, MAC, etc.) independent of each other, and allowing the Internet to scale. Still, with modem applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, application experience optimization process 248 may leverage the concept of cognitive networking. Instead of taking a siloed approach where networking systems poorly understand user satisfaction, cognitive networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

As noted above, cognitive networks represent an evolution over existing networking techniques by focusing on the true user experience of an online application, rather than attempting to infer this information from proxy information, such as SLA violations (e.g., real SLA violations detected in the network or SLA violations predicted by a predictive network system). The scope of cognitive networks is also not specific to just voice and video applications and can be expanded to other types of applications, as well.

In instances in which real user feedback is used to train a QoE prediction model for an online application as part of a cognitive network, such a model may be agnostic to the views of individual users, instead taking a more aggregate approach. Indeed, user ratings are intrinsically subjective and noisy, and the model may not actually focus on individual outcomes, but instead rely on statistics thereof. More specifically, an assumption may be made that, given a situation X, if user A provides a positive label and user B provides a negative label, this might be due to:

1. Subjectivity biases: for instance, user A may consider the experience acceptable because the audio is excellent, while user B is unhappy because the video resolution is lower than usual. Of course, such differences are important and could be learned if the QoE model is provided with details about the user's focus, which are likely to be unavailable. In absence thereof, such contradictions appear randomly. Said differently, the criterion for users A and B for assessing the user experience are simply different. Note also that the same user A may sometimes have a different user experience under the same conditions, too (i.e., due to intrinsic human subjectivity).
2. Differences in understanding: in the same situation as before, user B may be unhappy because she had trouble joining the meeting. While this is a valid cause of dissatisfaction, the QoE model may not capture such aspects and these contradictions will again appear randomly.
3. Incorrect feedback: for instance, user B may simply have clicked on the wrong button or maliciously provided contradictory feedback.

Because of the above factors, the QoE model may instead rely on probabilistic metrics, which do not consider individual outcomes, but rather statistics thereof. In other words, rather than measuring the ability of the model to predict whether a given sample is positive or negative (e.g., acceptable QoE or not), but rather its probability of being positive (or negative).

Measuring Performance in Cognitive Networks

The techniques herein introduce new metrics and strategies to assess the performance and efficacy of QoE-driven (aka cognitive) networks on different tasks:

1. Issue detection: the QoE prediction model allows the operator to detect problems. In this case, what matters is that the model capture situations where users are unsatisfied with high confidence. This is akin to a retrieval problem. Note that such user experience detection is simply not possible today with existing tools designed for detecting networking issues, which are poorly tied to user satisfaction and rely on static thresholds applied to networking KPIs as proxies for the true user experience. As detailed below, the techniques herein introduce two new metrics referred to as the Negative Retrieval Accuracy (NRA) and the Precision-Recall Gain (PRG), to evaluate this task. It is critical to note that the design of such metrics is the most challenging task when designing a system for assessing true QoE, such as in cognitive network systems.

2. Decision making and what-if scenarios: in some aspects, the techniques herein may also use the QoE model to compare different situations and decide which one leads to the highest fraction of satisfied users. For instance, this can be done when the system triggers network actions (e.g., path changes, activation of QoS) to reduce the number of users having a poor experience. This is akin to a bipartite ranking problem. In further aspects, the techniques herein also introduce a metric referred to as the Robust Ranking Accuracy (RRA). In this case, the objective is not to assess a probability of user satisfaction, but rather whether a network action is likely to improve the QoE, which is of the utmost importance in the context of automation.

3. Visibility: another aspect of the techniques herein is the ability of the QoE model to provide a network or application owner some visibility into whether application users have good or poor experiences. For instance, predictions could be presented on a heatmap or overlaid on top of a network topology. Here, the aim may be to obtain both reliable (i.e., well calibrated probabilities) and informative predictions (i.e., good retrieval capabilities). Issue detection and visibility do overlap to some extent but, in the first case of issue detection, the focus is to detect specifically users with poor experience. For this task, a Brier Score or other suitable metric could be used as the metric.

Illustratively, the techniques described herein may be performed by hardware, software, and/or firmware, such as in accordance with application experience optimization process 248, which may include computer executable instructions executed by the processor 220 (or independent processor of interfaces 210) to perform functions relating to the techniques described herein.

Specifically, according to various embodiments, a device uses a quality of experience model to make predictions comprising probabilities of a quality of experience metric for an online application accessed via a network being acceptable. The device determines, for each of a subset of the predictions having lowest probabilities of acceptable user experience from amongst the predictions, whether that prediction corresponds to a negative experience rating by a user of the online application. The device computes a negative retrieval accuracy for the quality of experience model based on a count of negative experience ratings associated with the subset and a size of the subset. The device uses the negative retrieval accuracy to detect an issue in the network.

Figure 5:
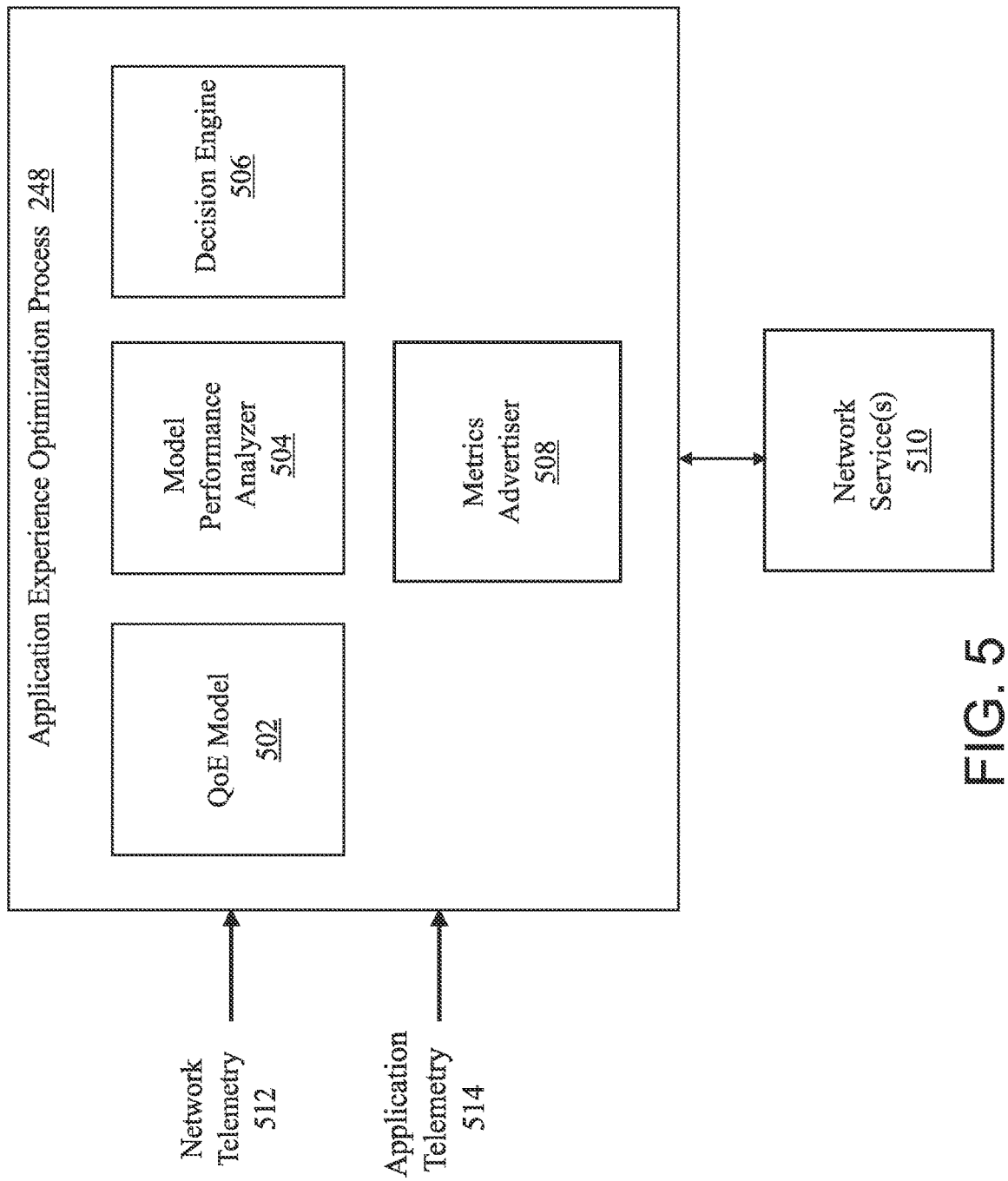
FIG. 5 illustrates an example architecture for measuring performance in cognitive networks.

Operationally, FIG. 5 illustrates an example architecture 500 for measuring performance in cognitive networks, according to various embodiments. At the core of architecture 500 is application experience optimization process 248, which may be executed by a controller for a network or another device in communication therewith. For instance, application experience optimization process 248 may be executed by a controller for a network (e.g., SDN controller 408 in FIGS. 4A-4B, such as part of predictive application aware routing engine 412), a particular networking device in the network (e.g., a router, a firewall, etc.), a server, another device or service in communication therewith, or the like.

As shown, application experience optimization process 248 may include any or all of the following components: a QoE model 502, a model performance analyzer 504, a decision engine 506, and/or a metrics advertiser 508. As would be appreciated, the functionalities of these components may be combined or omitted, as desired. In addition, these components may be implemented on a singular device or in a distributed manner, in which case the combination of executing devices can be viewed as their own singular device for purposes of executing application experience optimization process 248.

In various implementations, application experience optimization process 248 may obtain any or all of the following types of information, to support the operations of QoE model 502:

Network telemetry 512—such telemetry may be generated by one or more routers or other networking devices in the network (e.g., the CE router associated with a given endpoint client, etc.), an agent on the endpoint itself, or any other device in the network, and indicate performance metrics such as path loss, latency, jitter, etc. In various embodiments, network telemetry 512 may also include traceroute information captured by agents (e.g., ThousandEyes agents, etc.) executed by these devices performing path tracing/probing.

Application telemetry 514—In addition to obtaining network telemetry 512, application experience optimization process 248 may also obtain telemetry data generated by the online application of interest, itself. For instance, such telemetry may indicate the application experiences of its users, such as user satisfaction ratings (e.g., as collected within the application, collected by a bot separate from the application, etc.), application-level metrics that could indicate the true QoE of the application (e.g., concealment rate, etc.), or other such information.

In various embodiments, model performance analyzer 504 may assess the performance of QoE model 502 by computing metrics introduced herein such as the Negative Retrieval Accuracy (NRA) and Precision-Recall Gains (PRG) metrics, which are used for the purpose of detecting issues in the network.

As would be appreciated, issue detection is akin to the problem of information retrieval, wherein one uses a system (e.g., a search engine) to retrieve a set of results from a database. The key metrics in this area are those of precision and recall. Now, such metrics can only be computed for a given threshold. Alternatively, one can measure the so-called gain of a given model with respect to a baseline (e.g., a random retrieval) across a plurality of thresholds.

By way of illustration, consider the following scenario: given a dataset of $N_{tot}$ samples, there may be a subset that were rated "bad QoE" by the users. This then raises the following question: what is the precision and recall obtained by retrieving the N samples with the lowest predicted QoE, given different values of N? As N is varied, the expected precision and recall might change. More specifically, if N is larger than the total number of negatives, the precision can never be 1.0, as there will always be at least some positives. Conversely, if N is smaller than the total number of negatives, the recall can never be 1.0.

However, setting the value of N to the total number of negatives $N_{tot}^-$ in the dataset causes the precision and the recall to be equal: each negative retrieved contributes to increasing both the precision and the recall by the same amount. This value is referred to herein as the Negative Retrieval Accuracy (NRA), and it is given by:

$$NRA = \frac{N^-}{N}$$

where $N^-$ is the number of negative samples retrieved out of N retrieved samples, which coincides with $N\_tot^-$, that is, the total number of negative samples in the dataset.

To illustrate this strategy with an example, assume that there is a dataset of 1,000 samples, out of which 70 are negatives (i.e., positivity of 93%). The NRA consists in taking the 70 samples with the smallest predicted QoE and counting how many actual negatives are in this set. If 30 negatives are retrieved, the NRA would be 42.9% (30/70).

Note that the NRA lies in the interval [0, 1], but even a random retrieval will lead to a non-zero performance, and it will be close to the global fraction of negatives in the dataset. The NRA of a random algorithm is the global fraction of negative, written $N_{tot}^-/N_{tot}$.

Furthermore, the absolute value of both precision and recall are non-interpretable, as their value is influenced by subjectivity. Feedback from overly forgiving users can arbitrarily decrease precision of a perfect model (as they act as false positives in the retrieval of bad QoE situations). Conversely, feedback from overly demanding users can arbitrarily decrease recall of an otherwise perfect model, as they are associated with situations that are considered as favorable by the majority. This means that an NRA of 1.0 is, in principle, not achievable, even by a perfect classifier.

While setting $N=N_{tot}^-$ simplifies things because recall and precision are identical in this case, a good model should achieve a consistent performance across a wide range of regimes (e.g., retrieving a lot more or a lot less samples than the number of negatives, which is anyway unknown in practice). Therefore, model performance analyzer 504 may use the same approach for different values of N, measure the precision and recall (which may now differ as N is not equal to the total number of negatives), and rescale those according to i.) the baseline set by a random classifier, and ii.) the maximal value of precision and recall that can be achieved given the value of N.

Indeed, for some values of N, the maximal value of precision and recall are not 1.0. As a result, model performance analyzer 504 may modify the scaling strategy accordingly:

$$Gain = \frac{value - baseline}{max - baseline}$$

This strategy is identical whether model performance analyzer 504 compute a precision or recall gain. The value of max and baseline are set based on the value of N, which determines the upper bound of the value and the baseline of a random sampling strategy, respectively. All these values can be computed by model performance analyzer 504 analytically using basic probability theory. For instance, if the value is a recall metric and the number of retrieved samples N is only half of the total number of negatives, then max is set to 0.5 and baseline is set to $N/N_{tot}$. If value is a precision metric and the number of retrieved samples N is twice the total number of negatives, then model performance analyzer 504 may set the max to 0.5 and the baseline to the global fraction of negatives.

Model performance analyzer 504 may also compute what is referred to herein as the Precision Recall Gain (PRG), which is the average gains of precision and recall across a set of values for N, e.g., corresponding to regular fractions of the total sample size between 2.5% and 50%.

In various embodiments, decision engine 506 may be responsible for the evaluation of decision-making and what-if scenarios. In this case, the calibration of predicted probabilities is not very important. Instead, the critical aspect is whether the predictions by QoE model 502 induce a correct ordering over the samples, i.e., the higher the prediction, the higher the frequency of positive outcomes. This is essentially a bipartite ranking problem and can be more formally described as maximizing the area under the receiver operating characteristic (ROC) curve.

A classical measure of performance for ranking algorithms is the so-called empirical ranking error, which is the fraction of positive-negative pairs that are ranked incorrectly by the model, i.e., a higher probability is assigned to the negative sample than to the positive sample, wherein ties are broken at random uniformly. The empirical ranking error is equal to one minus the area under the ROC curve (AUC). Indeed, although it is not obvious from its formulation, the AUC of a model is the probability that a randomly drawn positive is assigned a higher score than a randomly drawn negative, which is an intuitive interpretation.

For instance, consider the case in which there is the following dataset, ordered by decreasing predictions:

TABLE 1

| # | Label | Prediction |
|---|---|---|
| 1 | + | 0.85 |
| 2 | + | 0.74 |
| 3 | + | 0.48 |
| 4 | − | 0.52 |
| 5 | − | 0.39 |

Here, there are three positives and two negatives, and therefore six pairs of samples with opposite labels to consider. Out of those, five pairs are correctly ordered (i.e., the negative sample is assigned a lower prediction than the positive sample), but one pair is incorrectly ordered (i.e., the pair (3, 4)). In this example, the empirical ranking error is 16.7% (⅙) and the AUC is 83.3% (⅚).

However, the AUC is not robust to noisy or adversarial examples, as it considers individual outcomes, as opposed to statistics thereof. Ideally, though, incurred errors are statistically significant.

To address this limitation, decision engine 506 may consider a bin-wise version of the AUC, which is referred to herein as the Robust Ranking Accuracy (RRA). This metric answers the question: "what is the probability that model ranks correctly two randomly drawn sets of samples with different positivity?" In essence, the RRA is a robust extension of the AUC, and its value can be interpreted similarly. The key difference lies in the fact that ties, i.e., pairs whose distribution are not statistically different, are explicitly treated as such and never contribute to the count of correctly ranked pairs. Incorrectly ranked pairs contribute negatively to the score, which is why it lies in the interval [−1, 1], with a random classifier achieving a score of 0.0.

To compute the RRA, decision engine 506 may use a strategy called bootstrapping in statistics, which is used to construct hypothesis tests to rule out differences due to random fluctuations. To do so, decision engine 506 may draw random samples with replacement to build sets of identical size, but with different positivities f⁺ (e.g., to build a set with 75% positivity, decision engine 506 may sample 75 positive samples and 25 negative samples). Then, decision engine 506 may consider pairwise combinations of positivity ($f_A^+$, $f_B^+$). For instance, consider the following:

TABLE 2

| $f_A^+$ | $f_B^+$ |
|---|---|
| 0.0 | 0.05 |
| 0.0 | 0.10 |
| ... | ... |
| 0.5 | 0.55 |
| 0.5 | 0.60 |
| ... | ... |
| 0.95 | 1.0 |

Essentially, for each combination of positivity in the above table, decision engine 506 may draw two sets of K samples A and B, with positivity $f_A^+$ and $f_B^+$, respectively. Decision engine 506 may then perform inference on these two sets, which yields $Q_A$ and $Q_B$, which are sets that contain the predictions for each sample in X. Decision engine 506 can then perform a two-sample, Mann-Whitney U test to check if there is a failure that falls into any of the following scenarios:

The distribution underlying $Q_A$ is significantly less than the distribution underlying $Q_B$. In such a case, decision engine 506 can therefore increment $N_{correct}$ by one.
The distribution underlying $Q_B$ is significantly less than the distribution underlying $Q_A$. In such a case, decision engine 506 can therefore increment $N_{incorrect}$ by one.
The null hypothesis H0 cannot be rejected.

The RRA is then given by the formula:

$$RRA = \frac{(N_{correct} - N_{incorrect})}{N_{total}}$$

where $N_{total}$ is the total number of pairs considered. Note that, despite the fact that the AUC and the RRA have different domains, their interpretation are somewhat similar. The key difference is the scores of random rankers, i.e., AUC=0.5 and RRA=0.0. In both cases, these scores can be interpreted as the probability that the algorithm, presented with a pair of samples, will rank them correctly, except that the RRA requires the score differences to be significant, which is never the case for a random algorithm, hence the score of zero.

In various implementations, metrics advertiser 508 may also share any or all of the above metrics with any number of network services 510. Indeed, various services may exist in the network to optimize the user experience of an online application. In addition, some network services 510 may use metrics such as the NRA and PRG for purposes of issue detection. Typically, such a use case would be performed by a network management system (NMS) (e.g., DNAC by Cisco Systems, Inc., Meraki Dashboards, etc.). Visibility services could also fall in the same category. For instance, a custom user interface could be implemented to report such metrics (along with detailed explanations), to allow an administrator to measure/assess the probability of application users having a satisfactory user experience. Such metrics could also potentially replace existing metrics used to detect SLA violations that are based on static networking KPI templates and/or metrics (most of the time proprietary) used to compute a "score" (using custom formula).

In another embodiment, metrics such as the Robust Ranking Accuracy (RRA) may be used by various control planes to trigger actions in the network. In such an embodiment, metrics advertiser 508 may convey the RRA metrics within control plane services, such as a Path Computation Element (PCE) upon computing paths as a custom type-length-value (TLV) via a Path Computation Element Protocol (PCEP) protocol message. For instance, PCEP already supports a PCRep message requesting more than one path and a custom bit could be specified requesting the computation of multiple paths, each with different RRA metrics. In other instances, the RRA metrics could also be used in conjunction with BGP (for cross-domain paths), to perform distributed and on-line path selection. This can be done according to a specified path selection policy whereby the value of the RRA metric could override the traditional routing metrics dedicated to the Layer-3 path characteristics.

A prototype implementing the above techniques was created and used to evaluate the performance of different models used on user labels collected by a bot (best results are shown in bold):

TABLE 3

|  | rand | ues | ues-calib | ens10 | ens10-calib | ens30 | ens30-calib |
|---|---|---|---|---|---|---|---|
| Log-loss | 1.000 | 0.326 | 0.275 | 0.266 | 0.275 | 0.266 | 0.276 |
| Brier score | 0.332 | 0.086 | 0.073 | 0.071 | 0.072 | 0.071 | 0.072 |
| AUC | 0.500 | 0.600 | 0.602 | 0.668 | 0.666 | 0.667 | 0.665 |
| RRA | 0.000 | 0.571 | 0.590 | 0.729 | 0.714 | 0.724 | 0.714 |
| NRA | 0.087 | 0.224 | 0.219 | 0.259 | 0.258 | 0.264 | 0.261 |
| PRG | 0.000 | 0.203 | 0.201 | 0.310 | 0.307 | 0.311 | 0.310 |

Note that the log-loss and the Brier score are both losses, i.e., the lower, the better, whereas for all other metrics the higher, the better. All other metrics are described previously above.

From Table 3, a few observations can be made:

1. The log-loss or Brier score have extremely limited variability, although other metrics vary more significantly. As can be seen, all of the QoE prediction models outperform the Webex user experience scores (UES) on all metrics.

2. The NRA values remain low even for the best models, peaking at 26.4%. While this may seem poor, we must remember that the overall negativity of the dataset is only of 7.7% and a perfect model may achieve an NRA anywhere between 28.4% and 100%, depending on the Bayes error rate.

3. The lift between the Webex UES and the best models is quite modest on the NRA (22.4% vs 26.4%), but significantly larger on precision/recall gains (20.3% vs 31.1%). This indicates that the QoE models have a more consistent behavior across the entire range of predictions.

4. The lift between the Webex UES and the best models is significant on the AUC (60% vs 66.8%), but even more so on the RRA (59% vs 72.9%). This suggests that the models are extracting the true signal from quite noisy samples (to which the AUC is more sensitive).

Figure 6:
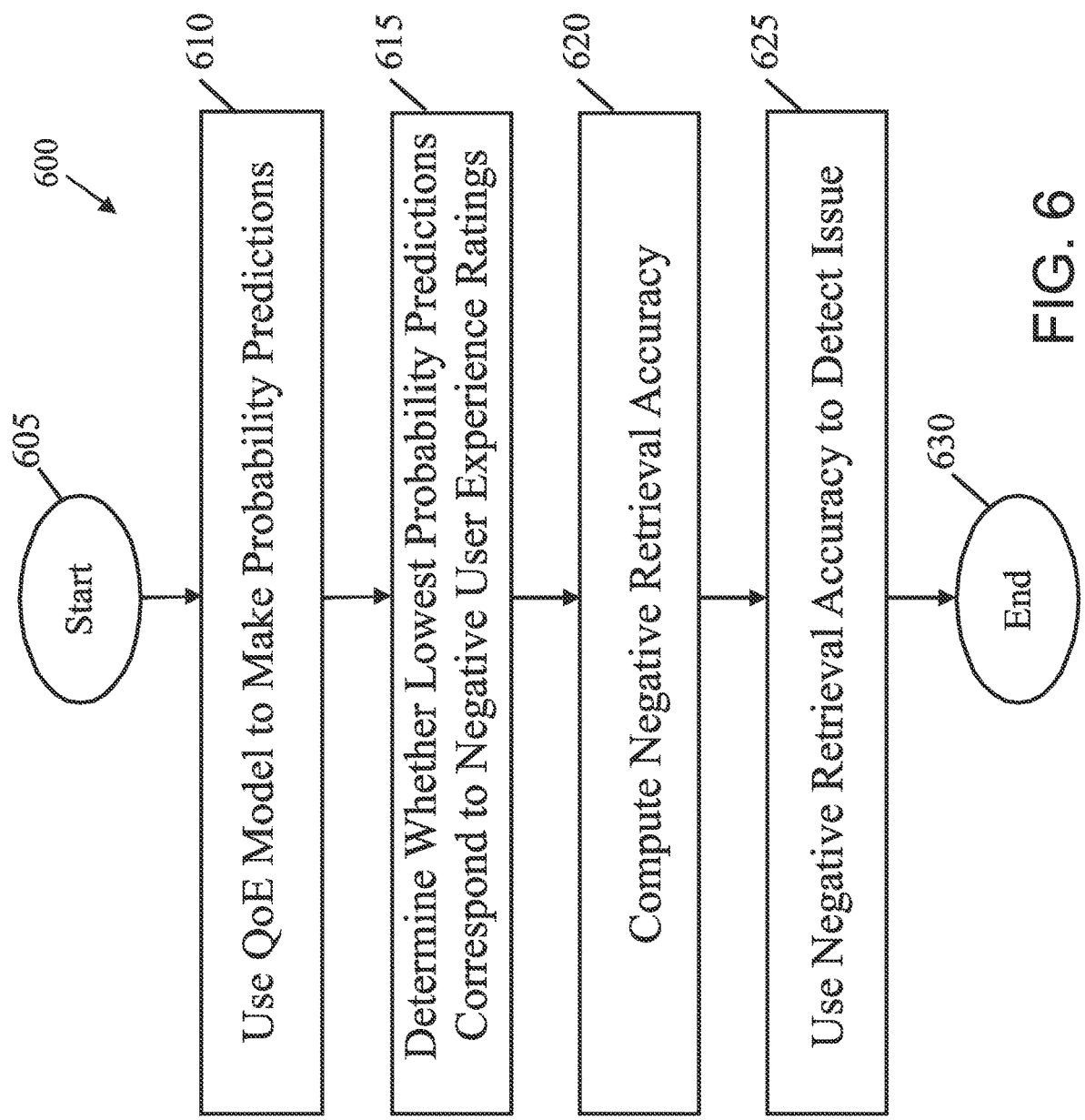
FIG. 6 illustrates an example simplified procedure for measuring performance in cognitive networks.

FIG. 6 illustrates an example simplified procedure 600 (e.g., a method) for measuring performance in cognitive networks, in accordance with one or more embodiments described herein. For example, a non-generic, specifically configured device (e.g., device 200), such as a router, firewall, controller for a network (e.g., an SDN controller or other device in communication therewith), server, or the like, may perform procedure 600 by executing stored instructions (e.g., application experience optimization process 248). The procedure 600 may start at step 605, and continues to step 610, where, as described in greater detail above, the device may use a quality of experience model to make predictions comprising probabilities of a quality of experience metric for an online application accessed via a network being acceptable. In various implementations, the quality of experience model makes the predictions based on telemetry data captured by the network.

At step 615, as detailed above, the device may determine, for each of a subset of the predictions having lowest probabilities of acceptable user experience from amongst the predictions, whether that prediction corresponds to a negative experience rating by a user of the online application. In some instances, a size of the subset of the predictions differs from a total amount of the predictions whose probabilities indicate negative user experiences.

At step 620, the device may compute a negative retrieval accuracy for the quality of experience model based on a count of negative experience ratings associated with the subset and a size of the subset. In various implementations, the device may also compute a robust ranking accuracy metric in part by randomly selecting pairs of samples associated with different subsets of the predictions, wherein the pairs of samples have different percentages of positive user experience labels. In some implementations, the device may use the robust ranking accuracy metric to override a routing decision in the network. In further implementations, the device may also provide the robust ranking accuracy metric to a path computation element or via a Border Gateway Protocol message in the network. In some instances, the device computes the robust ranking accuracy metric in part by performing two-sample Mann-Whitney U testing on the pairs.

At step 625, as detailed above, the device may use the negative retrieval accuracy to detect an issue in the network. In some implementations, the device may also provide the negative retrieval accuracy for presentation by a user interface. In some implementations, the device may further vary a size of the subset to compute different precision and recall metrics for the quality of experience model, compute gain values for the different precision and recall metrics, and compute a precision recall gain metric as an average of the gain values for the different precision and recall metrics. In some instances, the device may also use the precision recall gain metric is used to detect the issue in the network.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for measuring performance in cognitive networks, it is to be understood that various other adaptations and modifications may be made within the spirit and scope of the embodiments herein. For example, while certain embodiments are described herein with respect to using certain models for purposes of predicting application experience metrics (e.g., QoE metrics), SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
using, by a device, a quality of experience model to make predictions comprising probabilities of a quality of experience metric for an online application accessed via a network being acceptable;
determining, by the device and for each of a subset of the predictions having lowest probabilities of acceptable user experience from amongst the predictions, whether that prediction corresponds to a negative experience rating by a user of the online application;
computing, by the device, a negative retrieval accuracy for the quality of experience model based on a count of negative experience ratings associated with the subset and a size of the subset; and
using, by the device, the negative retrieval accuracy to detect an issue in the network.

2. The method as in claim 1, wherein the quality of experience model makes the predictions based on telemetry data captured by the network.

3. The method as in claim 1, further comprising:
providing, by the device, the negative retrieval accuracy for presentation by a user interface.

4. The method as in claim 1, wherein a size of the subset of the predictions differs from a total amount of the predictions whose probabilities indicate negative user experiences.

5. The method as in claim 1, further comprising:
computing a robust ranking accuracy metric in part by randomly selecting pairs of samples associated with different subsets of the predictions, wherein the pairs of samples have different percentages of positive user experience labels.

6. The method as in claim 5, further comprising:
using, by the device, the robust ranking accuracy metric to override a routing decision in the network.

7. The method as in claim 5, further comprising:
providing the robust ranking accuracy metric to a path computation element or via a Border Gateway Protocol message in the network.

8. The method as in claim 5, wherein the device computes the robust ranking accuracy metric in part by performing two-sample Mann-Whitney U testing on the pairs.

9. The method as in claim 1, further comprising:
varying a size of the subset to compute different precision and recall metrics for the quality of experience model;

computing gain values for the different precision and recall metrics; and computing a precision recall gain metric as an average of the gain values for the different precision and recall metrics.

10. The method as in claim 9, wherein the precision recall gain metric is used to detect the issue in the network.

11. An apparatus, comprising:
one or more network interfaces;
a processor coupled to the one or more network interfaces and configured to execute one or more processes; and
a memory configured to store a process that is executable by the processor, the process when executed configured to:
use a quality of experience model to make predictions comprising probabilities of a quality of experience metric for an online application accessed via a network being acceptable;
determine, for each of a subset of the predictions having lowest probabilities of acceptable user experience from amongst the predictions, whether that prediction corresponds to a negative experience rating by a user of the online application;
compute a negative retrieval accuracy for the quality of experience model based on a count of negative experience ratings associated with the subset and a size of the subset; and
use the negative retrieval accuracy to detect an issue in the network.

12. The apparatus as in claim 11, wherein the quality of experience model makes the predictions based on telemetry data captured by the network.

13. The apparatus as in claim 11, wherein the process when executed is further configured to:
provide the negative retrieval accuracy for presentation by a user interface.

14. The apparatus as in claim 11, wherein a size of the subset of the predictions differs from a total amount of the predictions whose probabilities indicate negative user experiences.

15. The apparatus as in claim 11, wherein the process when executed is further configured to:
compute a robust ranking accuracy metric in part by randomly selecting pairs of samples associated with different subsets of the predictions, wherein the pairs of samples have different percentages of positive user experience labels.

16. The apparatus as in claim 15, wherein the process when executed is further configured to:
use the robust ranking accuracy metric to override a routing decision in the network.

17. The apparatus as in claim 15, wherein the process when executed is further configured to:
provide the robust ranking accuracy metric to a path computation element or via a Border Gateway Protocol message in the network.

18. The apparatus as in claim 15, wherein the apparatus computes the robust ranking accuracy metric in part by performing two-sample Mann-Whitney U testing on the pairs.

19. The apparatus as in claim 11, wherein the process when executed is further configured to:
vary a size of the subset to compute different precision and recall metrics for the quality of experience model;
compute gain values for the different precision and recall metrics; and
compute a precision recall gain metric as an average of the gain values for the different precision and recall metrics.

20. A tangible, non-transitory, computer-readable medium storing program instructions that cause a device to execute a process comprising:
using, by the device, a quality of experience model to make predictions comprising probabilities of a quality of experience metric for an online application accessed via a network being acceptable;
determining, by the device and for each of a subset of the predictions having lowest probabilities of acceptable user experience from amongst the predictions, whether that prediction corresponds to a negative experience rating by a user of the online application;
computing, by the device, a negative retrieval accuracy for the quality of experience model based on a count of negative experience ratings associated with the subset and a size of the subset; and
using, by the device, the negative retrieval accuracy to detect an issue in the network.

* * * * *